United States Patent Office 2,850,514
Patented Sept. 2, 1958

2,850,514

ORGANOMETALLOIDS

Walter H. Knoth, Jr., Middletown, Del., assignor to E. I. du Pont de Nemours and Company, Wilmington, Del., a corporation of Delaware No Drawing. Application October 25, 1955
Serial No. 542,764

9 Claims. (Cl. 260—448.2)

This invention relates to new heterocyclic compounds. More particularly, it relates to new heterocyclic compounds containing silicon atoms as ring members, to their preparation, and to their polymerization by ring opening.

Linear polymers containing carbon and silicon atoms in regular alternation, that is, having the skeleton $$-\overset{|}{\underset{|}{C}}-\overset{|}{\underset{|}{Si}}-$$

in the polymer chain have valuable technical properties. Thus, U. S. Patent 2,483,972 discloses linear polymers containing intracatenic silicon atoms joined by methylene bridges. These are useful as hydraulic and damping fluids, etc.

This invention has as an object the preparation of new monomeric heterocyclic compounds. A further object is the preparation of new intermediates for polymers. Another object is the preparation of new raw materials for the production of hydraulic fluids, electrical insulating fluids, damping fluids, and lubricants. Other objects will appear hereinafter.

These objects are accomplished by the present invention of (A) 1,1,3,3 - tetraalkyl - 1,3 - disilacyclobutanes, i. e., compounds of the formula

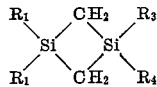

where the R's are alkyl radicals, preferably having from one to four carbon atoms, inclusive;

(B) The process of preparing these heterocyclic compounds which comprises reacting a 1,4-dihalo-2,2,4,4-tetraalkyl-2,4-disilabutane with a dehalogenating metal until ring closure has been brought about through removal of the halogen atoms; and (C) The process of preparing essentially linear carbon-silicon polymers of the general formula

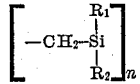

where the R's are alkyl groups and $n$ is an integer higher than 2, which comprises heating a 1,1,3,3-tetraalkyl-1,3-disilacyclobutane at a temperature above about 250° C. until polymerization by ring opening has taken place.

The 1,4 - dihalo - 2,2,4,4 - tetraalkyl - 2,4 - disilabutanes whose dehalogenation leads to the heterocyclic products of this invention can be obtained by the method, illustrated in greater detail below, which consists in replacing the trialkylsiloxy group of a 1-halo-4-(trialkylsiloxy)-2,2,4,4-tetraalkyl-2,4-disilabutane by fluorine through reaction with boron trifluoride by employing the method of U. S. Patent 2,713,063. See also Wiberg and Kruerke in Naturforschung, 8B, 608 (1953) and Sommer and Ansul, J. Am. Chem. Soc., 77, 2482 (1955). The 1-halo-4 - (trialkylsiloxy) - 2,2,4,4 - tetraalkyl - 2,4 - disilabutanes themselves can be prepared, according to known methods (see, e. g., U. S. 2,491,833) by the following series of reactions, where R and R' represent alkyl groups:

(1) 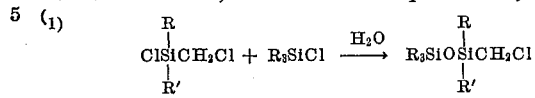

(2) 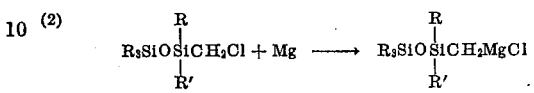

(3) 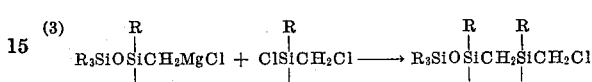

When R and R' are methyl, the starting material,

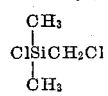

is prepared by chlorination of trimethylchlorosilane. See U. S. Patent 2,510,149. When R and R' are other alkyl groups (alike or different) a general method of preparing the starting chloromethyldialkylchlorosilane consists in reacting silicon tetrachloride with diazomethane to give chloromethyltrichlorosilane, which is then reacted with an alkylmagnesium chloride, or a mixture of two alkylmagnesium chlorides:

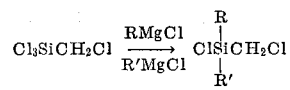

The diazomethane reaction has been described by Yakubovich and Ginsburg in J. Gen. Chem., U. S. S. R., 22, 1783 (1952).

The invention is illustrated in detail in the following examples.

EXAMPLE I

1 - chloro - 4 - fluoro - 2,2,4 - trimethyl - 2,4 - disilapentane was prepared by the following two-step method:

(A)
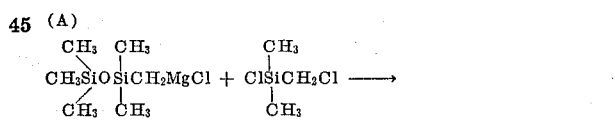

(B)
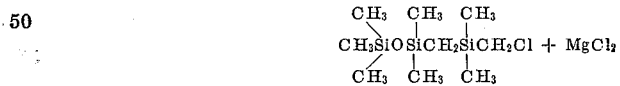

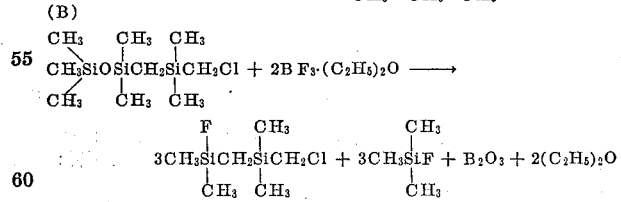

Reaction A was carried out by preparing a Grignard reagent, according to the method described by Bluestein in J. Am. Chem. Soc., 70, 3068 (1948), from 103 g. (0.525 mole) of chloromethylpentamethyldisiloxane and 12.8 g. (0.525 mole) of magnesium in 250 cc. of diethyl ether and treating it with 75 g. (0.525 mole) of chloromethyldimethylchlorosilane [both reactants are described by Krieble and Elliott, J. Am. Chem. Soc. 67, 1810 (1945)]. The mixture was heated to reflux and stirred for about 16 hours. Saturated ammonium chloride solution was then added until the inorganic salts separated, leaving a clear supernatant ether layer. This was filtered, the solid was washed with ether and the wash ether was combined with the liquid filtrate. After removing the ether from this solution, distillation gave 103.2 g. (73% yield) of 1-chloro-2,2,4,4,6,6,-hexamethyl-5-oxa-2,4,6-trisilaheptane,

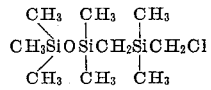

B. P. 88°–89° C. at 8 mm. pressure, $n_D^{26}$ 1.4380.

*Analysis*

Calculated for $C_9H_{25}ClOSi_3$: C, 40.2%; H, 9.31%. Found: C, 40.66%; H, 9.37%.

Reaction B was carried out by mixing 22 g. (0.082 mole) of 1-chloro-2,2,4,4,6,6-hexamethyl-5-oxa-2,4,6-trisilaheptane with 20 g. (0.14 mole) of boron trifluoride ethyl etherate and immediately distilling the mixture until the solid residue in the distillation vessel was dry. The distillate on redistillation gave 3.8 g. of 1-chloro-4-fluoro-2,2,4-trimethyl-2,4-disilapentane,

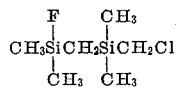

B. P. 170°–175° C. The reaction residue was extracted with ether and the extract was distilled to give an additional 3.7 g. (total yield 46%) of 1-chloro-4-fluoro-2,2,4-trimethyl-2,4-disilapentane.

*Analysis*

Calculated for $C_8H_{16}ClFSi_2$: C, 36.30%; H, 8.07%; Cl, 17.90%; Neut. Equiv.: 198.5. Found: C, 36.73%; H, 8.29%; Cl, 17.85%; Neut. Equiv.: 195.

1,1,3,3-tetramethyl-1,3-disilacyclobutane was prepared by dehalogenation of the dihalo compound as follows: To a mixture of 3.16 g. (0.13 mole) of magnesium and 50 cc. of dry diethyl ether was added a small amount of 1 - chloro - 4 - fluoro - 2,2,4 - trimethyl - 2,4 - disilapentane and the reaction was started by the addition of three drops of an ether solution of methylmagnesium iodide. The reaction mixture was heated to reflux temperature, an additional 50 cc. of diethyl ether was added and the remainder of a 26 g. (0.13 mole) portion of 1-chloro-4-fluoro - 2,2,4 - trimethyl - 2,4 - disilapentane, dissolved in 100 cc. of diethyl ether, was added with rapid stirring over a 40-minute period. After completion of the addition, the stirring and refluxing were continued for 3½ hours. The mixture was then filtered and the solid filtrate was washed with ether. Washings and liquid filtrate combined were distilled to give 9.04 g. (43% yield) of 1,1,3,3-tetramethyl-1,3-disilacyclobutane,

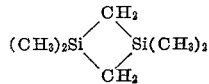

B. P. 117°–119° C., $n_D^{27}$ 1.4380.

*Analysis*

Calculated for $C_6H_{16}Si_2$: C, 50.00%; H, 11.10%; Si, 38.90%; M. W., 144. Found: C, 49.98%; H, 11.27%; Si, 38.29%; M. W., 133.

The addition of a few drops of this compound to an alcoholic solution of silver nitrate resulted in the formation of elemental silver, as evidenced by the formation of a silver mirror. The addition of 1,1,3,5-tetramethyl-3,3-disilacyclobutane to a weak solution of bromine in carbon tetrachloride resulted in slow decolorization of the solution.

EXAMPLE II

A 5 g. sample of 1,1,3,3-tetramethyl-1,3-disilacyclobutane was heated at 300° C. for 1½ hours under nitrogen at a pressure of 400 lbs./sq. in. The reaction product was then heated to 230° C. under reduced pressure (0.07 mm. of mercury) to remove the low boiling materials. The product was a viscous oil having the composition of a poly(dimethylsilmethylene),

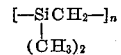

and showing a molecular weight of about 15,000.

The above described ring closure dehalogenation process is generically applicable to the preparation of 1,1,3,3 - tetraalkyl - 1,3 - disilacyclobutanes from 1,4-dihalogeno-2,2,4,4-tetraalkyldisilabutanes. Thus other 1,4-dihalogeno-2,2,4,4-tetraalkyl-2,4-disilabutanes can be substituted for the one used in Example I (whose specific name is 1-chloro-4-fluoro-2,2,4-trimethyl-2,4-disilapentane, this nomenclature being preferable to 1-chloro-4-fluoro-2,2,4,4-tetramethyl-2,4-disilabutane), other 1,1,3,3-tetraalkyl-1,3-disilacyclobutanes being obtained. These compounds have the general formula

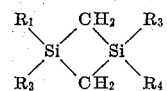

where the R's are alkyl groups. Among them may be mentioned 1,1 - dimethyl - 3,3-diethyl-1,3-disilacyclobutane; 1,1,3,3-tetraethyl-1,3-disilacyclobutane; 1,1-diethyl-3,3-di-n-butyl-1,3-disilacyclobutane; 1,1-dimethyl-3,3-diisopropyl-1,3-disilacyclobutane; 1,1,3,3-tetra-n-propyl-1,3-disilacyclobutane; 1,1,3,3-tetra-sec. butyl-1,3-disilacyclobutane; 1,1,3,3-tetra-n-butyl-1,3-disilacyclobutane; and the like. The most readily available and therefore preferred of these new heterocyclic compounds are those in which the alkyl groups have from one to four carbon atoms, and particularly those in which all the alkyl groups are alike.

Any 1,4-dihalogeno-2,2,4,4-tetraalkyl-2,4-disilabutane of the formula

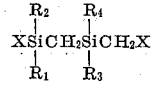

where the X's are halogen atoms and the R's are alkyl groups can be used, the preferred materials being those in which the alkyl groups are all alike and are lower alkyl, i. e., have from one to four carbon atoms. The halogen atoms may be the same or different, and they are preferably those of atomic numbers 9 to 35, inclusive, i. e., fluorine, chlorine or bromine. The metals suitable for use in this reaction are those whose use in the dehalogenation of aliphatic dihalides (sometimes called the Freund reaction) is well known and established. These metals including principally sodium, magnesium, and zinc, and especially the first two listed. The experimental procedure is not critical and in any event it is a well known one, preferred conditions being the use of a dry, inert solvent or diluent and of a reaction temperature between about 0° C. and 150° C.

This invention also includes the process of preparing essentially linear polymers of the dialkylsilmethylene type. These polymers contain the recurring unit

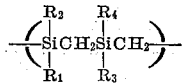

where the R's are alkyl groups, preferably having from one to four carbons and preferably all alike. The process consists in heating a 1,1,3,3-tetraalkyl-1,3-disilacyclobutane or a mixture of two or more different 1,1,3,3-tetraalkyl-1,3-disilacyclobutanes at a temperature above about 250° C., preferably in an inert, non-oxidizing atmosphere, until polymerization takes place, as evidenced by the formation of non-volatile products, e. g., products which do not distill at 250° C. under a pressure of 0.1 mm. of mercury.

The polymers obtainable by the process of this invention are characterized by high thermal and chemical stability and are useful as lubricants, hydraulic fluids, damping fluids, waterproofing fluids, electrical insulating fluids (for example, transformer oils) and as foam preventers in aqueous and non-aqueous systems. The 1,1,3,3-tetraalkyl-1,3-disilacyclobutanes of this invention are particularly useful as intermediates leading to these polymers.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A 1,1,3,3-tetraalkyl-1,3-disilacyclobutane, each of the four alkyl groups having 1–4 carbon atoms.
2. A 1,3-disilacyclobutane having, as its only substituents, four alkyl groups each having 1–4 carbon atoms, and these substituents on the silicon atoms.
3. A 1,3-disilacyclobutane having, as its only substituents, four lower alkyl groups, and these on the silicon atoms.
4. 1,1,3,3-tetramethyl-1,3-disilacyclobutane.
5. The process which comprises reacting a 1,4-dihalogeno-2,2,4,4-tetraalkyl-2,4-disilabutane with magnesium and isolating the 1,1,3,3-tetraalkyl-1,3-disilacyclobutane.
6. The process which comprises reacting a 1,4-dihalogeno-2,2,4,4-tetramethyl-2,4-disilabutane with magnesium and isolating the 1,1,3,3-tetramethyl-1,3-disilacyclobutane.
7. The process of preparing polymers which comprises heating a 1,1,3,3-tetraalkyl-1,3-disilacyclobutane of claim 1 at a temperature of at least 250° C. preferably in an inert atmosphere until products are formed which are non-volatile at 250° C. and 0.1 mm. of mercury.
8. The process of claim 7 where the silacyclobutane is 1,1,3,3-tetramethyl-1,3-disilacyclobutane.
9. The process which comprises heating the product of claim 5.

References Cited in the file of this patent
UNITED STATES PATENTS
2,483,972 Goodwin _____ Oct. 4, 1949

OTHER REFERENCES

Hart: "Report British Association," page 661 (1887).
Roberts et al.: "Am. Chem. Soc. Jour.," vol. 72, pages 1879–1880 (1951).
West: "Am Chem. Soc. Jour.," vol. 76, pages 6012–6017 (1954) and vol. 77, page 2339 (1955).
Sommer: "Am. Chem. Soc. Jour.," vol. 76, page 5002 (1954).